April 7, 1931.  W. A. WULLE  1,799,941
CONDUIT
Filed Aug. 27, 1926   2 Sheets-Sheet 2
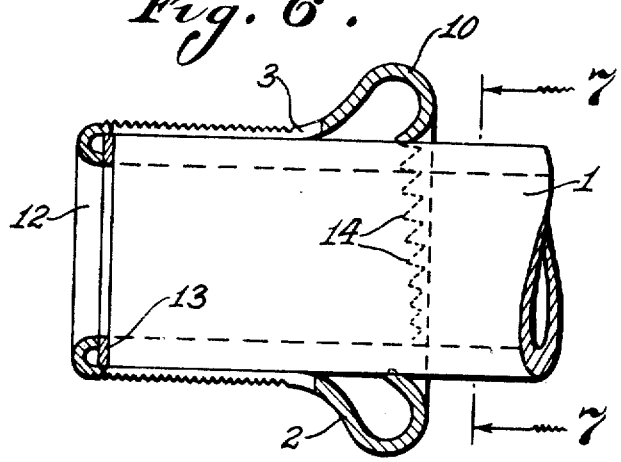
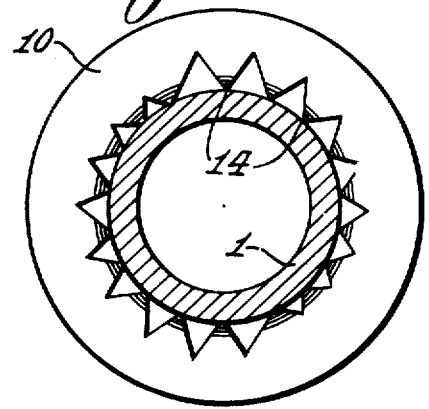
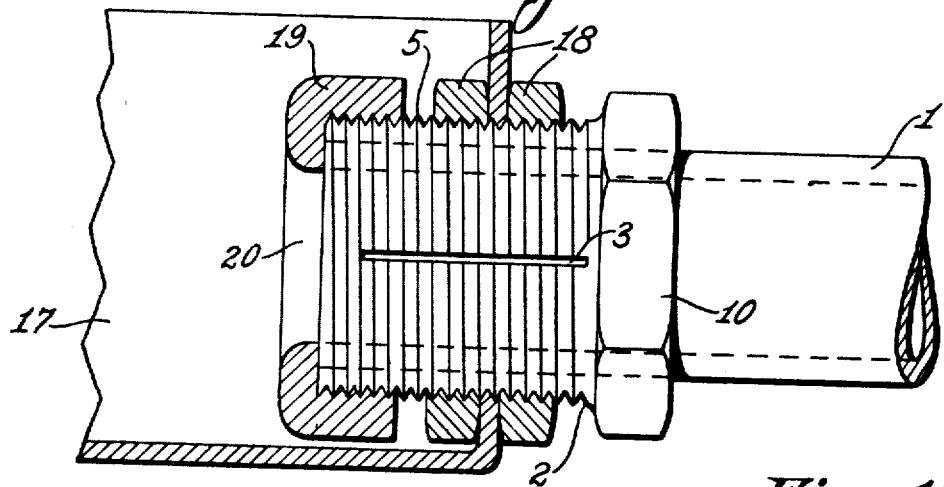
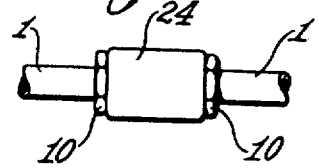
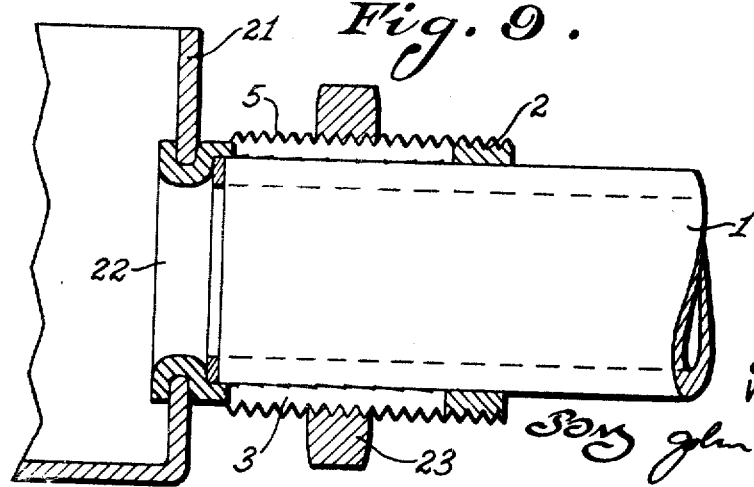

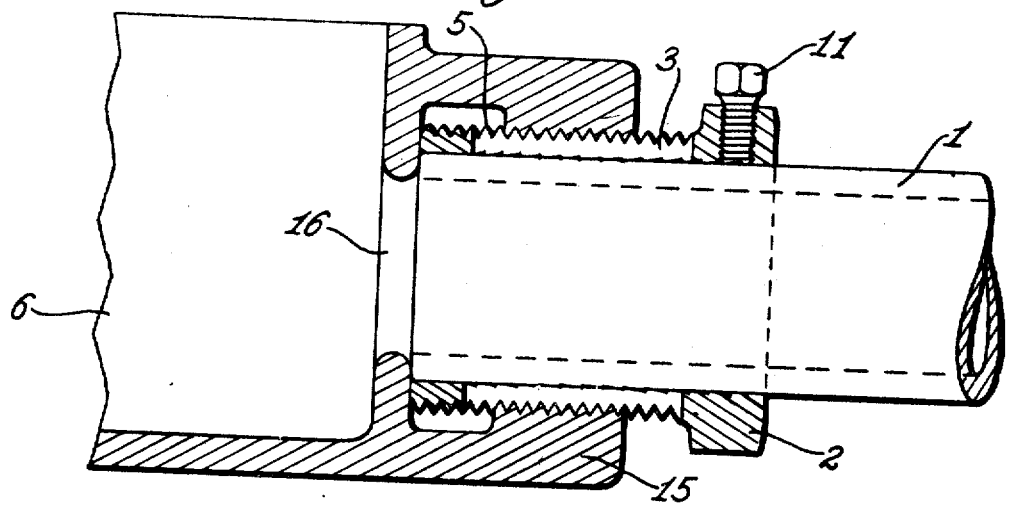
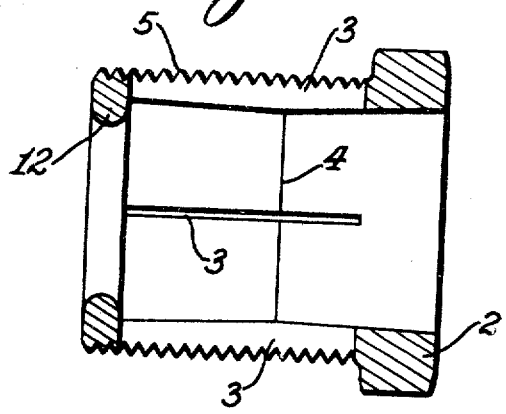
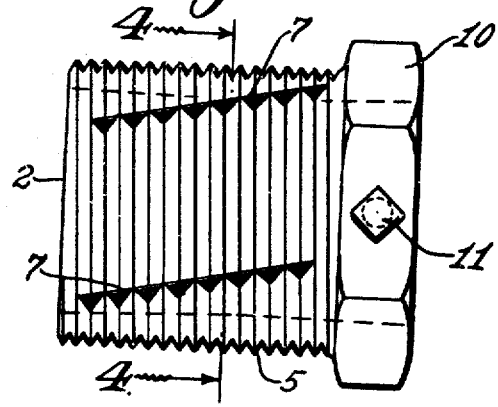
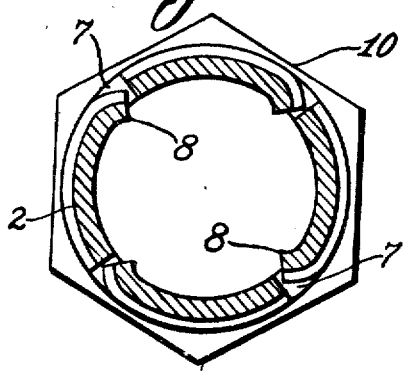
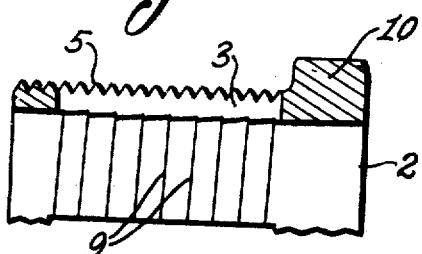

Patented Apr. 7, 1931

1,799,941

UNITED STATES PATENT OFFICE

WILLIAM A. WULLE, OF CHICAGO, ILLINOIS

CONDUIT

Application filed August 27, 1926. Serial No. 131,887.

This invention pertains to construction for conduits such as are used to contain electric circuit wires and the like.

In the ordinary conduit construction in the wiring of buildings and the like, a great deal of time is consumed in threading the ends of conduit sections so as to be able to secure the same to the various fittings and to each other.

One of the objects of this invention is to provide a construction whereby the necessity for threading the ends of conduit sections would be eliminated and means provided for securing the conduit sections to each other or to suitable fittings.

Another object of this invention is to provide a fitting which may be applied to a conduit section in a simple manner and in a short time and which will provide means for securing the conduit.

Another object is to provide a threaded fitting which may be applied, without special tools, to a conduit section and which will enable the same to be connected with other standard conduit fittings.

Further objects will appear from the following description, taken in connection with the accompanying drawings, in which Figure 1 is a sectional view of a conduit fitting embodying this invention;

Figure 2 is a sectional view of the attachable sleeve;

Figure 3 is a side view of a similar sleeve showing another embodiment of this invention;

Figure 4 is a section on line 4—4 of Figure 3;

Figure 5 is a partial section, similar to Figure 2, but showing means for roughing the interior surface of the sleeve;

Figure 6 is a sectional view of a sleeve showing another embodiment of this invention;

Figure 7 is a section on line 7—7 of Figure 6;

Figures 8 and 9 are sectional views showing methods of connecting a conduit section to an outlet box in accordance with this invention; and Figure 10 is a view showing a method of attaching two conduit sections together.

In accordance with this invention a fitting is provided which may be attached to the plain end of a section of conduit by a simple operation, such as slipping the fitting over the end of the conduit. This fitting takes the form, preferably, of a sleeve threaded on the outside with a thread adapted to fit in a standard fitting or connection of the next larger size of conduit to that of the section to which the sleeve is applied. The sleeve is so constructed that, when passed over the end of the conduit, it will securely grip the same so as to provide a secure fastening therefor.

Referring to the accompanying drawing, 1 designates a section of conduit of any ordinary type, such as may be used for housing the wires of any ordinary wiring installation.

In accordance with this invention when a section of conduit is to be connected to another similar section or to a fitting, it is simply cut to the required length and then a sleeve 2 is forced over the end thereof. The sleeve 2 is constructed to have a bore which is restricted relatively to the outside diameter of the conduit to which it is applied. The sleeve may then be forced over the end of the conduit so as to grip the same. The body of the sleeve may be made resilient so as to grip the conduit with a resilient pressure. This may be done by slotting the body of the conduit with slots 3. The bore of the sleeve may be constructed so as to taper from opposite ends in order to provide a restricted waist 4 of slightly smaller diameter than the conduit 1. When the sleeve is forced over the pipe, the body will then give at the waist 4 and grip the outside of the pipe with a strong, but resilient, pressure. The outside of the sleeve 2 is provided with threads 5 of a size corresponding to the next larger standard size than the conduit 1. With the sleeve in place on its end, the conduit may then be connected with any standard fitting or with another similar section of conduit by any usual method, the size of fittings used, however, being the next larger size than the conduit 1. A method of connecting a conduit in this manner to an outlet box 6 is shown in Figure 1.

In order to insure a secure grip of the sleeve upon the conduit, the interior surface of the former may be roughened in any suitable manner. In Figure 2, for instance, the waist 4 provides a ridge adapted to grip the conduit with a considerable frictional resistance. In Figures 3 and 4, the sleeve is shown cut longitudinally by slots 7 so as to render the body of the sleeve resilient as in the case of the slots 3, but the slots 7 are given a zig-zag form and the edges thereof punched inwardly, as shown in Figure 4, so as to provide teeth 8 on the interior surface of the sleeve which will bite into the surface of the conduit 1 and hold the same securely. When the sleeve is forced over the conduit its outside diameter is increased slightly, and when the sleeve is screwed into the fitting or a nut screwed on the outside of the sleeve, the latter is again compressed and the rough interior surface forced tight against the pipe.

Figure 5 shows the sleeve 2 provided with a series of internal ridges 9, providing teeth adapted to grip the conduit. As shown, these ridges may be arranged in the form of an internal thread in such a way that, when the conduit is turned with a wrench, the tendency will be to screw the sleeve onto the pipe. The teeth 8 of Figures 3 and 4 may also be so arranged that their rows form, in effect, a thread for the same purpose. In fact, any of the tooth arrangements described herein may be so formed. The sleeve may also be provided with a head 10 of angular form so that a wrench may be applied thereto for turning the sleeve in order to thread the same into its fitting. The head 10 may also be provided with a set screw 11, or similar fastening, in order to increase the hold of the sleeve upon the conduit 1.

In Figures 6 and 7 a sleeve 2 is shown formed of light metal by drawing in a die or other similar process. This sleeve is also provided with slots 3, which render the same resilient, and a head 10, which may be either angular or round so that a wrench may be applied thereto for turning the sleeve. In the case of a round head, of course, a pipe wrench is used for this purpose. The end of the sleeve may be provided with a rounded edge 12 adapted to engage the wires as they emerge from the conduit. This curled-in edge may also be provided to engage a gasket 13 clamped between the end of the conduit and said edge and adapted to render the fitting waterproof. The rearward edge of the head 10 may be provided with teeth 14 to increase the friction on the pipe. These teeth may also be arranged in screw-thread formation. The rounded edge 12 may also be applied to any of the other modifications of the sleeve, as shown, for instance, in Figure 2.

Figures 1, 8 and 9 illustrate methods of connecting the conduit to fittings. In Figure 1 the fitting 6 is provided with an extension 15 which is threaded to receive the sleeve 2. This fitting is provided with an inwardly extending collar 16 having a rounded edge over which the emerging wires may be turned.

In Figure 8 the conduit is applied to a fitting, such as the ordinary knock-out box, represented by the numeral 17. In this case the sleeve is passed through the knock-out hole in the box and held by nuts 18 on the inside and outside of the box, while the usual collar or bushing 19 is applied to the end of the sleeve so as to provide a rounded edge 20.

In Figure 9 the box or other fitting 21 has the sleeve 2 mounted thereon by crimping the edge of the sleeve into the hole in the box as shown at 22. This also provides a rounded edge to protect the wires. A nut 23 is then screwed up on the sleeve 2 from the outside end. As the threads on the sleeve are the usual pipe threads which are tapered, screwing up the nut 23 will clamp the sleeve securely against the conduit.

In Figure 10 two sections of conduit are shown connected together by an ordinary coupling 24. This coupling is a size larger than the conduit 1, and the sleeves on the two sections are screwed into it in the usual manner.

It will be seen that this invention provides a very simple construction for erecting conduit work. The construction is such that very little time is required for applying the necessary securing means to the end of a conduit section. The slow operation of threading the end of the pipe is entirely eliminated. Also the tools required for such threading operation are not necessary. It is only necessary to cut the conduit to the proper length, slip a sleeve 2 over the end and then screw the same into the required fitting, said fitting being of the next larger size of conduit. The sleeve should fit closely enough that it may be driven upon the end of the pipe and will then grip the same tightly so that a wrench may be applied to the pipe and the sleeve screwed into the fitting. The interior of the sleeve may be roughened, as described, so as to insure a secure hold of the sleeve on the pipe. In this way conduits may be run vertically, and this fastening will be capable of supporting the weight of the pipe. The invention is easily adapted to all types of fittings used in modern conduit construction.

It is obvious that various changes may be made in the details of construction without departing from the spirit of this invention; it is to be understood, therefore, that this invention is not limited to the specific details shown and described.

Having thus described the invention what is claimed is:

1. In a connection for metal conduits, in combination with an internally threaded connecting member, a sleeve externally threaded to fit said member and having a resilient body circumferentially continuous at both ends and having a portion of its bore contracted intermediate its ends to a diameter less than the outside diameter of the conduit, said sleeve being adapted to be sprung over the conduit thereby enlarging its external threaded portion intermediate its ends.

2. In a connection for metal conduits, in combination with an internally threaded connecting member, a sleeve externally threaded to fit said member and having a longitudinally split resilient body circumferentially continuous at both ends and having a portion of its bore contracted intermediate its ends to a diameter less than the outside diameter of the conduit, said sleeve being adapted to be sprung over the conduit thereby enlarging its external threaded portion intermediate its ends.

3. In a connection for metal conduits, in combination with an internally threaded connecting member, a sleeve externally threaded to fit said member and having a resilient body circumferentially continuous at both ends and having a portion of its bore contracted intermediate its ends to a diameter less than the outside diameter of the conduit, said sleeve being adapted to be sprung over the conduit thereby enlarging its external threaded portion intermediate its ends, and means providing a tooth in the bore of said sleeve adapted to bite into the conduit.

4. In a connection for metal conduits, in combination with an internally threaded connecting member, a sleeve externally threaded to fit said member and having a resilient body circumferentially continuous at both ends and having a slot adapted to render said sleeve expandible, the edge portion of said sleeve adjacent said slot being forced inwardly to a diameter less than the outside diameter of the conduit to provide a tooth adapted to bite into the conduit.

In testimony whereof I affix my signature this 5th day of August, 1926.

WILLIAM A. WULLE.